US009369938B2

(12) United States Patent
Biggs et al.

(10) Patent No.: US 9,369,938 B2
(45) Date of Patent: Jun. 14, 2016

(54) SUBSCRIBER IDENTITY MODULE (SIM) FOR MOBILE STATIONS

(75) Inventors: Todd S. Biggs, Kirkland, WA (US); Robert E. Rapp, London (GB); Alois Widmann, Vaduz (LI)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 677 days.

(21) Appl. No.: 12/415,700

(22) Filed: Mar. 31, 2009

(65) Prior Publication Data

US 2010/0248690 A1    Sep. 30, 2010

(51) Int. Cl.
| H04M 3/16 | (2006.01) |
| H04W 36/38 | (2009.01) |
| H04W 12/12 | (2009.01) |
| H04B 1/3816 | (2015.01) |
| G06G 7/122 | (2006.01) |

(52) U.S. Cl.
CPC .......... H04W 36/385 (2013.01); G06G 7/122 (2013.01); H04B 1/3816 (2013.01); H04W 12/12 (2013.01)

(58) Field of Classification Search
CPC ...... H04B 1/3816; H04W 8/12; H04W 12/12; G06G 7/122
USPC ........... 455/433, 558, 411; 370/328; 711/115; 703/24
See application file for complete search history.

(56) References Cited

U.S. PATENT DOCUMENTS

| 6,332,579 | B1 | 12/2001 | Ritter | |
| 6,516,357 | B1* | 2/2003 | Hamann et al. | 710/2 |
| 6,799,155 | B1* | 9/2004 | Lindemann et al. | 703/24 |
| 6,851,606 | B2 | 2/2005 | Maenpaa et al. | |
| 7,162,408 | B2 | 1/2007 | Kashyap et al. | |
| 7,171,460 | B2 | 1/2007 | Kalavade et al. | |
| 7,406,312 | B2 | 7/2008 | Prise | |
| 8,019,923 | B2* | 9/2011 | Asfur | 710/301 |
| 8,369,894 | B1* | 2/2013 | Zhu | G06Q 20/3226 235/380 |
| 2001/0027528 | A1 | 10/2001 | Pirkey et al. | |
| 2002/0061745 | A1 | 5/2002 | Ahn et al. | |

(Continued)

FOREIGN PATENT DOCUMENTS

| WO | 2006094564 A1 | 9/2006 |
| WO | 2007/143342 | 12/2007 |
| WO | 2008040964 A2 | 4/2008 |

OTHER PUBLICATIONS

Author Unknown, definition of "Subscriber Identity Module" from Wikipedia, downloaded Jan. 30, 2009 at http://en.wikipedia.org/wiki-Subscriber_Idetnity_Module, 9 pages.

(Continued)

*Primary Examiner* — Danh Le
(74) *Attorney, Agent, or Firm* — Judy Yee; Bryan Webster; Micky Minhas

(57) ABSTRACT

Methods and systems for associating a mobile station subscriber with at least one application or service are provided. The subscriber is provided with a subscriber identity module ("SIM") identifier, which identifies a SIM associated with the subscriber. The SIM identifier is bound to the application or service. The SIM identifier and the application or service are registered with a home location register ("HLR") to bind the SIM identifier to the application or service. If the SIM is a virtual SIM, the provider of an application or service may cover the data costs associated with the use of that application or service.

20 Claims, 3 Drawing Sheets

(56) References Cited

U.S. PATENT DOCUMENTS

| | | | |
|---|---|---|---|
| 2003/0051041 A1* | 3/2003 | Kalavade et al. | 709/229 |
| 2003/0190908 A1* | 10/2003 | Craven | 455/411 |
| 2004/0139201 A1 | 7/2004 | Chaudhary et al. | |
| 2005/0075106 A1* | 4/2005 | Jiang | H04M 3/42263 |
| | | | 455/432.3 |
| 2005/0124288 A1 | 6/2005 | Karmi et al. | |
| 2006/0046693 A1* | 3/2006 | Tran et al. | 455/411 |
| 2006/0046710 A1* | 3/2006 | Lohlein et al. | 455/423 |
| 2006/0172723 A1 | 8/2006 | Ishikawa | |
| 2006/0218227 A1* | 9/2006 | Spear | 709/203 |
| 2006/0291455 A1 | 12/2006 | Katz et al. | |
| 2007/0033344 A1* | 2/2007 | Tanaka | G06F 3/0605 |
| | | | 711/115 |
| 2007/0091843 A1* | 4/2007 | Patel et al. | 370/331 |
| 2007/0142031 A1 | 6/2007 | Lee et al. | |
| 2007/0153768 A1 | 7/2007 | Jagadesan et al. | |
| 2007/0280177 A1* | 12/2007 | Uusikartano et al. | 370/338 |
| 2008/0254766 A1 | 10/2008 | Craven | |
| 2008/0305763 A1* | 12/2008 | Wijayanathan et al. | 455/404.2 |
| 2009/0017817 A1 | 1/2009 | Bleckert et al. | |
| 2009/0132813 A1* | 5/2009 | Schibuk | 713/158 |
| 2009/0186656 A1* | 7/2009 | Jain | 455/558 |
| 2009/0227230 A1* | 9/2009 | Camilleri | H04W 8/04 |
| | | | 455/408 |
| 2010/0030846 A1* | 2/2010 | Martin et al. | 709/203 |
| 2010/0165960 A1* | 7/2010 | Richardson | 370/338 |
| 2010/0279698 A1* | 11/2010 | Wong | H04W 88/06 |
| | | | 455/450 |

OTHER PUBLICATIONS

Author Unknown, definition of "Network switching subsystem" from Wikipedia, downloaded Feb. 5, 2009 at http://en.wikipedia.org/wiki/Home_Location_Register, 8 pages.

Kasper, et al., "Subscriber Authentication in Cellular Networks with Trusted Virtual SIMs", Proceedings of the 10th International Conference on Advanced Communication Technology, retrieved at <<http://ieeexplore.ieee.org/stamp/stamp.jsp?arnumber=04493913>>, Feb. 17-20, 2008, pp. 903-908.

\* cited by examiner

SUBSCRIBER IDENTITY MODULE (SIM) FOR MOBILE STATIONS

BACKGROUND

Wireless communication networks such as CDMA and TDMA-based networks are rapidly being deployed worldwide. One example of such a network is the Global system for mobile communication (GSM). GSM provides circuit-switched data services to subscribers, such as mobile telephone or computer users. General Packet Radio Service (GPRS), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications.

The rapid growth in sophistication of wireless communication networks as well as the mobile devices used to communicate over such networks is likely to give rise to an ever increasing number of services and features that can be offered on these various devices. As the number and sophistication of such services and features continue to grow, many different software applications will be required for their implementation. Some of these applications will reside on the mobile device itself and others will reside in whole or in part on a network server that the mobile device will access on-line. Techniques and mechanisms for limiting access to these applications and services to authorized subscribers can be complex and cumbersome to implement. In addition, many consumers may not have subscription plans that allow them to access these on-line services without paying additional fees.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

When a mobile subscriber wishes to make use of various applications and services over a wireless network it is important to ensure that the subscriber is authorized to access them. Illustrative examples of such applications and service include without limitation, mapping applications and services, business grade e-mail, location based services, e-commerce services and the like. One convenient way to establish an association between the subscriber and the applications and services is to bind a unique subscriber identity module (SIM) to each application or service (or group of applications or services) that the subscriber is authorized to access.

In one illustrative example, a method is provided for associating a mobile station subscriber with at least one application or service. In order to establish this association, the subscriber is provided with a SIM identifier identifying a SIM associated with a subscriber. The SIM identifier is to be bound to the application or service that the subscriber is authorized to access over a wireless network. The SIM identifier and the application or service is registered with a home location register (HLR) so that the SIM identifier is thereby bound to the application or service.

This Summary is provided to introduce a selection of concepts in a simplified form that is further described below in the Detailed Description. This summary is not intended to identify key features or essential features of the claimed subject matter, nor is it intended to be used as an aid in determining the scope of the claimed subject matter. Additional features and advantages of the invention will be made apparent from the following detailed description of embodiments that proceeds with reference to the accompanying drawings.

DETAILED DESCRIPTION

The methods and techniques described herein may be implemented in a wide variety of different wireless networks in which a mobile station such as a mobile phone employs a SIM. For instance, in some examples the wireless network may be a 2G radio system such as a GSM (Global System for Mobile Communications), which is based on TDMA (Time Division Multiple Access) technology. In other examples, the wireless network may be a 3G radio system which is based on a GSM system which utilizes WCDMA (Wideband Code Division Multiple Access) technology or a UMTS (Universal Mobile Telecommunications System). In a UMTS-based network the SIM is sometimes referred to as a USIM (Universal Subscriber Identity Module), whereas in CDMA-based network the SIM is sometimes referred to as a RUIM (Removable User Identity Module). For simplicity all of these modules will be generically referred to herein as a SIM. For purposes of illustration only the present invention will be described in the context of a GSM network that includes a GPRS network for providing internetworking with external packet-switched networks.

Figure 1:
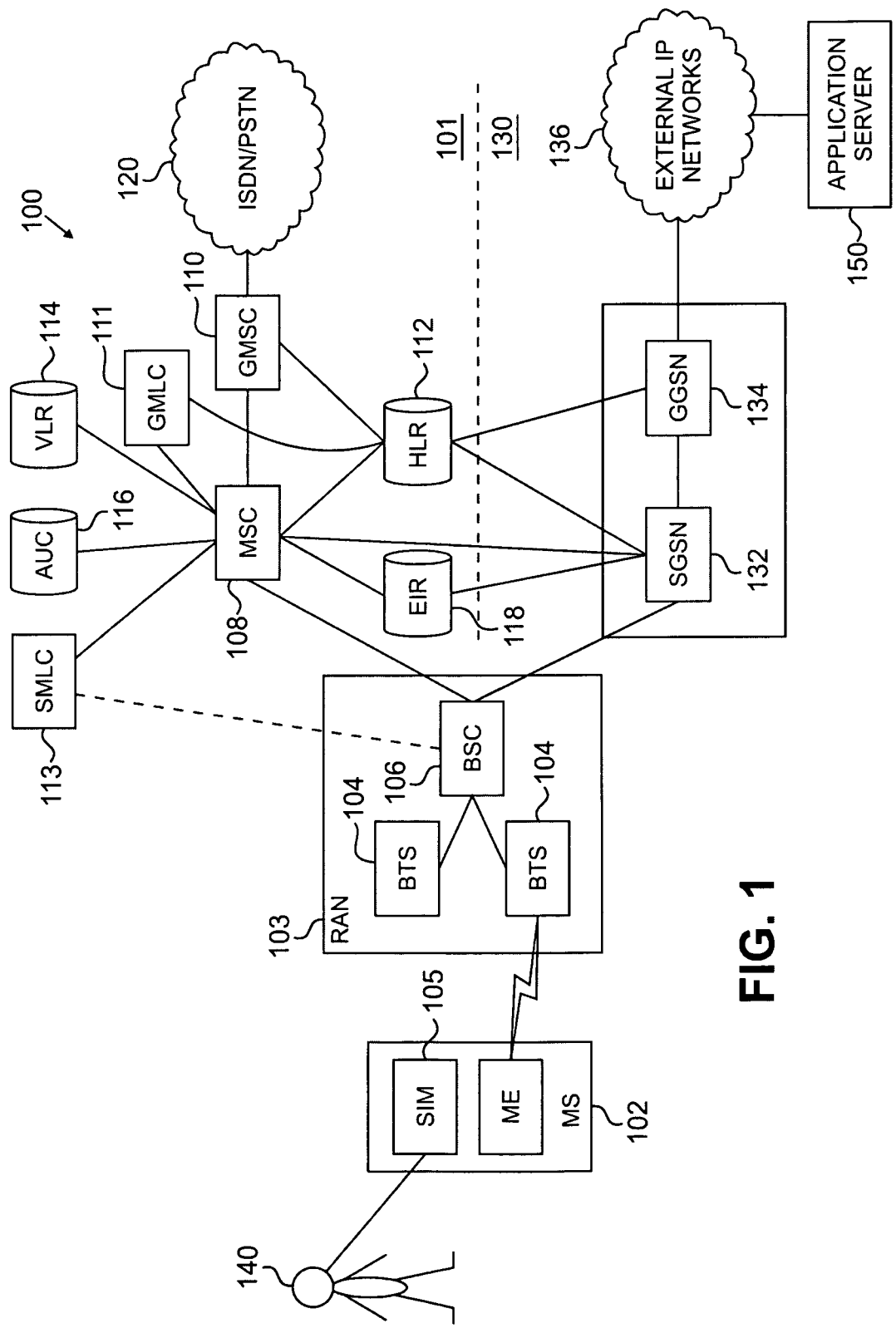
FIG. 1 is an overview of one example of a wireless communication environment.

FIG. 1 shows a GSM/GPRS network architecture 100 that includes a GSM core network 101 and a GPRS network 130. The GSM core network 101 includes a Mobile Station (MS) 102, at least one Base Transceiver Station (BTS) 104 and a Base Station Controller (BSC) 106. The MS 102 is physical equipment or Mobile Equipment (ME), such as a mobile phone or a laptop computer that is used by mobile subscribers. Each subscriber 140 is characterized by a relation between the subscribers 140 and the mobile stations 102 the subscriber uses. The mobile stations 102 also have a unique identity, defined by the IMEISV. In order to associate the subscriber and the mobile station 102, a SIM card 105 is introduced in the mobile station 102. The position of the SIM card 105 constitutes the connection with the mobile station 102, while the connection between the SIM card 105 and the subscriber 140 is made by an agreement registered in a database. The SIM card 105 also has an identifier, defined by the International Mobile Subscriber Identity (IMSI). As a summary, the subscriber is identified by the MSISDN, the SIM card by the IMSI and the mobile station by the IMEISV.

The BTS 104 is physical equipment, such as a radio tower, that enables a radio interface to communicate with the MS. Each BTS may serve more than one MS. The BSC 106 manages radio resources, including the BTS. The BSC may be connected to several BTSs. The BSC and BTS components, in combination, are generally referred to as a base station (BSS) or radio access network (RAN) 103.

The GSM core network 101 also includes a Mobile Switching Center (MSC) 108, a Gateway Mobile Switching Center (GMSC) 110, a Home Location Register (HLR) 112, Visitor Location Register (VLR) 114, an Authentication Center (AuC) 116, and an Equipment Identity Register (EIR) 118. The MSC 108 performs a switching function for the network. The MSC 108 also performs other functions, such as registration, authentication, location updating, handovers, and call routing. The GMSC 110 provides a gateway between the GSM network and other networks, such as an Integrated Services Digital Network (ISDN) or Public Switched Telephone Networks (PSTNs) 120. In other words, the GMSC 110 provides interworking functionality with external networks.

The HLR 112 is a database that contains administrative information regarding each subscriber registered in a corresponding GSM network. The HLR 112 also contains the current location of each MS. The HLR 112 stores details of every SIM issued by the mobile operator. Individual subscriber records are typically accessed by the IMSI and/or the MSISDN, which serve as primary keys to the records.

The VLR 114 is a database that contains selected administrative information from the HLR 112. The VLR 114 contains information necessary for call control and provision of subscribed services for each MS currently located in a geographical area controlled by the VLR 114. The HLR 112 and the VLR 114, together with the MSC 108, provide the call routing and roaming capabilities of GSM. The VLR 114 may reside on the same platform as the MSC 108 or the GMSC 110 or a call server. The AuC 116 provides the parameters needed for authentication and encryption functions. Such parameters allow verification of a subscriber's identity. The EIR 118 stores security-sensitive information about the mobile equipment.

Location services (LCS) are provided by a Gateway Mobile Location Center (GMLC) 111 and/or a Serving Mobile Location Center (SMLC) 113. The GMLC 111 may request routing information from the HLR 112 and send positioning requests to either the Visited Mobile Switching Centre (VMSC, not shown), a Serving GPRS Support Node (SGSN 132) or MSC 108, and receives final location estimates from the corresponding entity.

The SMLC 113 is either a separate network element or an integrated functionality in the BSC 106. The SMLC manages the overall coordination and scheduling of resources required for the location of a MS 102. The SMLC 1113 also calculates the final location estimate and estimates the achieved accuracy. The SMLC 113 may control a number of Location Measurement Unit (LMU) for the purpose of obtaining radio interface measurements to locate or help locate MS subscribers in the area that it serves.

To gain access to GSM services, such as speech, data, and short message service (SMS), the MS first registers with the network to indicate its current location by performing a location update and IMSI attach procedure. The MS 102 sends a location update including its current location information to the MSC 108/VLR 114, via the BTS 104 and the BSC 106. The location information is then sent to the MS's HLR 112. The HLR 112 is updated with the location information received from the MSC 108/VLR 114. The location update also is performed when the MS moves to a new location area. Typically, the location update is periodically performed to update the database as location updating events occur.

The GPRS network 130 is logically implemented on the GSM core network architecture by introducing two packet-switching network nodes, the serving GPRS support node (SGSN) 132 and a Gateway GPRS support node (GGSN) 134. The SGSN 132 is at the same hierarchical level as the MSC 108 in the GSM network. The SGSN 132 controls the connection between the GPRS network and the MS 102. The SGSN 132 also keeps track of individual MS's locations and security functions and access controls. The GGSN 134 provides a gateway between the GPRS network and a public packet network (PDN) or other IP networks 136. That is, the GGSN provides interworking functionality with external networks, and sets up a logical link to the MS through the SGSN 132. When packet-switched data leaves the GPRS network, it is transferred to an external TCP-IP network 136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN 132, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time. A class B MS can attach to the network for both GPRS services and GSM services simultaneously. However, a class B MS does not support simultaneous operation of the GPRS services and GSM services. That is, a class B MS can only use one of the two services at a given time. A class C MS can attach for only one of the GPRS services and GSM services at a time. Simultaneous attachment and operation of GPRS services and GSM services is not possible with a class C MS.

As previously mentioned, subscribers are increasingly using their mobile stations to access a wide variety of different applications and services above and beyond their normal wireless mobile telephony services (e.g., the aforementioned class A, B and C service levels) that allow them to communicate voice and data over a wireless network. Examples of such applications and services include, without limitation, mapping applications and services, instant messaging, business grade e-mail, location based services, e-commerce services and the like. In order for a mobile subscriber to access such applications and services over the wireless network it is important to associate the subscriber with the specific applications and services that the subscriber is authorized to access. In this way third party spoofing can be prevented so that unauthorized third parties do not gain access to the applications and services. One way to establish this association is to bind a unique SIM to each application or service (or group of applications or services) that the subscriber is authorized to access. Such a SIM is referred to hereinafter as an application-specific SIM.

Such application-specific SIMs can be distributed to the mobile subscribers in a variety of different ways. For instance, SIM cards can be provided by the mobile device manufacturers themselves or by other distributors and may be made available for purchase at retail outlets. In another implementation a virtual SIMs may be downloaded to the mobile device over the wireless network as part of a service application or separately from a service application. In a virtual SIM, the functionality of one or more hardware-based SIM cards is implemented by embedded software residing on the mobile station as part of a standalone service application, part of the mobile operating system, or as a common component shared by service applications needing at access the network. The software therefore emulates the functions of the SIM card(s).

Regardless of the manner in which the application-specific SIM is acquired, after the SIM registers with the HLR the HLR will maintain a record that associates the IMSI of the application-specific SIM and the application(s) and/or services that the SIM is authorized to access. The HLR that maintains these records may be the HLR associated with the wireless system operator, such as HLR 112 shown in FIG. 1. Alternatively, the HLR may be a separate HLR that is operated by a third party for the purpose of providing the mobile station with access to packet-network (e.g., Internet) based applications and/or services. The third party HLR will then need to communicate with the wireless communication system's infrastructure in order to establish a connection between the mobile station and the Internet-based entity that provides the application(s) and/or services. In FIG. 1 this entity is shown as application server 150. Typically, though not necessarily, the operator of application server 150 will bear the cost for establishing the connection between the mobile station and the HLR.

Figure 2:
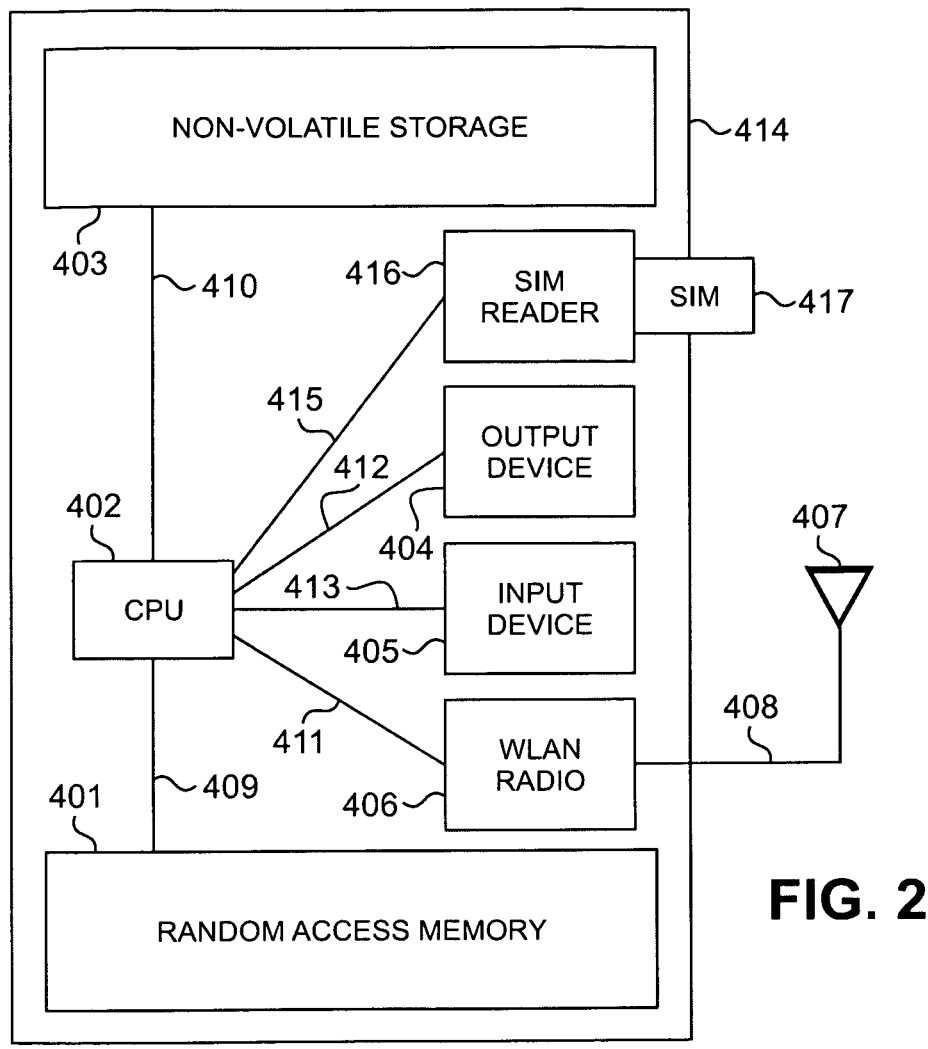
FIG. 2 shows one example of a mobile station that incorporates an application-specific SIM.

An example of a mobile station that incorporates an application-specific SIM is shown in FIG. 2. The mobile station 414 includes a CPU (Central Processing Unit) 402 that communicates over a connection or bus 410 with non-volatile storage 403 where various programs in the form of software instructions control the several devices 405, 406, 404, and 417, and perform their functions in the mobile station by being interpreted by the CPU. When the mobile station is powered on, the CPU 402 may copy the programs to Random Access Memory 401 over a connection or bus 409, or may run the programs directly from non-volatile storage 403. The mobile station typically has an output device 404, such as a screen or a speaker that communicates over connection 412 to the CPU 402. This output device 404 can be controlled by the programs resident in non-volatile memory 403 or random access memory 401. The device also typically has an input device 405 such as a keyboard, a mouse, or a microphone that communicates to the CPU 402 over connection 413. This input device 405 can be controlled by the programs resident in non-volatile memory 403 or random access memory 401. The mobile station has a WLAN radio 406 or equivalent that is connected to the CPU 402 over a connection or bus 411 and connected to an antenna 407 over connection 408. A SIM reader 416 is connected to the CPU 402 via connection 415. The SIM reader can accept a SIM card 417 and send and receive information from the SIM card 417. The SIM Card information is Sent to the CPU 402 over connection or bus 415.

As previously mentioned, in some implementations a virtual SIM card is employed in which the SIM card functionality is implemented within a software program executed by the CPU 402. In other words, virtual SIM modules operating on the CPU of the mobile station replace physical SIM cards.

Figure 3:
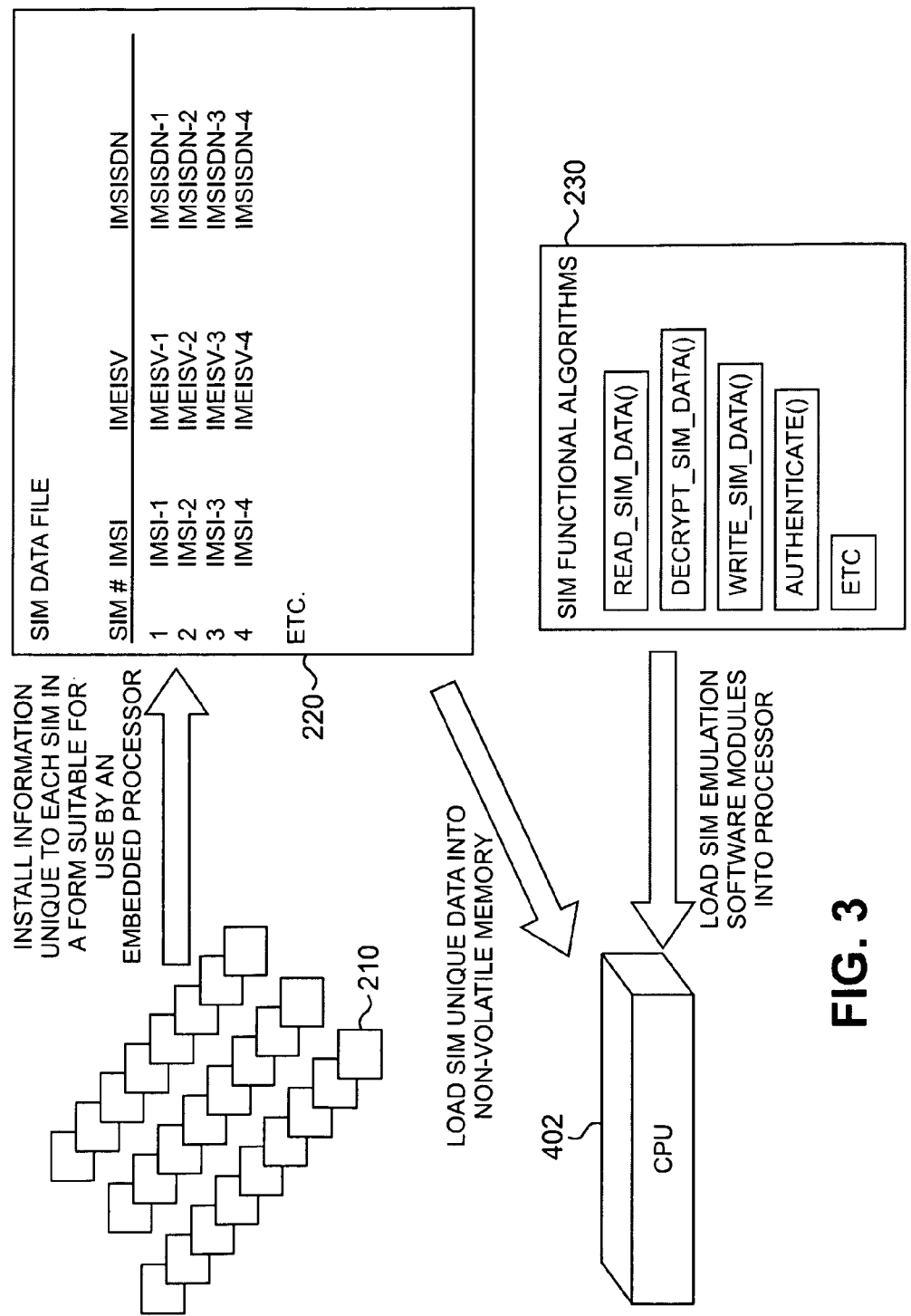
FIG. 3 shows one example of a virtual application-specific SIM.

FIG. 3 shows one implementation of a virtual SIM module in which the elementary data storage of the SIM card occupies a portion of the non-volatile memory 403 and SIM function emulation software operates on the embedded CPU 402. The SIM function emulation software includes functional algorithms executed by the SIM cards of the prior art. The virtual SIM modules have the advantage that no additional hardware outside the control system is necessary. Furthermore, a single virtual SIM module can provide the functionality of multiple SIM cards, thereby eliminating the need to remove and install a new SIM card each and every time the subscriber wishes to access a different application or service. In addition the virtual SIM card and the physical SIM card can be from the same or different service providers. In this way different service providers can use different economic models when offering services to consumers, and in some scenarios they could provide a user free or subsidized access to online services of a particular online services company. A virtual SIM can become a powerful tool in helping consumers who do not have data plans enjoy the benefits of data plans by being able to access online services, and having the service provider subsidize the costs of the data traffic to attract, retain, and grow mobile consumers who use particular online service.

In FIG. 3 the unique SIM data 210 normally installed into individual physical SIM cards are encrypted and stored in nonvolatile memory 403. As shown, the SIM data typically includes the MSISDN, the IMSI and the IMEISV. SIM data 210 are stored as a data file 220 having a form suitable for use by an embedded processor such as CPU 402 shown in FIG. 2, or another embedded micro-processor accessible by the mobile station. In this way the data file 220 can accommodate the equivalent of multiple physical SIM cards.

Emulation software 230 implements all the functions normally performed by physical SIM card 417. The functions are implemented in one or more software program modules loaded into and executed by the CPU 402. Emulation software 230 includes one or more software modules for performing all normal SIM card functions, including accessing the SIM unique data and unique subscriber identity data 210 stored in the non-volatile memory; decrypting the data where necessary; and performing authentication functions requested by external devices or networks.

One example of an application-specific virtual SIM of the type described above is a diagnostic SIM, which will be described below. Mobile stations such as mobile phones are increasingly complex devices that can require service and support throughout their life cycle. Such support may be needed beginning with the initial setup and configuration of the MS, and can re-occur many times during its life as configuration or other settings are lost such as may occur when the device requires a hard reset to the factory configuration. Support may also be needed when a failure causes the MS to be rendered unusable as a phone, an Internet connected device or both.

An increasingly important tool in resolving issues that arise with mobile phones is diagnostic software that resides on a PC or other computer. In addition to diagnosing problems, the software may update the mobile phone using information available on the PC itself or information such as updated configuration, settings, operating system images, and the like that are downloaded by the PC over the Internet.

However, it is not always convenient for a user to connect the mobile phone to a PC since a PC may not be available. Thus, the use of a PC as a tool for problem resolution may not be an option. A diagnostic SIM can resolve this problem, even when the mobile phone or other MS is in a state where it has been rendered unusable due to some fault. The diagnostic SIM can provide a guaranteed data connection to a diagnostic server via an HRL, from which the device can receive diagnostic services, device images, operating system updates, feature updates, or other data to restore the MS to a known or desired working state.

In some implementations the guaranteed data connection will be made available regardless of whether the user has subscribed for data access from their Mobile Operator and regardless of where in the world they are located, even if they do not have a global roaming subscription plan. In other implementations such a guaranteed data connection may be made available only if the use subscribes to a data access plan or if the user subscribes to a higher tier of service that offers guaranteed support services.

In some cases the cost of the guaranteed data connection may be borne by a third party such as the provider of the MS-resident software that requires the diagnostic services. For instance, the cost may be borne by the manufacturer of the MS operating system. In addition to performing the conventional SIM functions, the diagnostic SIM may also contain diagnostic, configuration, or boot loader software that will help the diagnostic server with which it connects resolve any of a variety of problems with the MS by providing ROM images and operating system fixes, updates, patches, QFE's, and the like. In the same way the MS may be provided with new operating system features and new applications.

In many cases it will be most convenient if the diagnostic SIM is implemented on a hardware card, particularly if the MS has stopped functioning entirely. However, the diagnostic SIM may also be implemented as virtual SIM, which may be useful if the MS retains a certain degree of functionality. If the diagnostic SIM is implemented in hardware, it may be provided to the subscriber along with the mobile station.

In one illustrative scenario, the diagnostic SIM may be used as follows. A user's MS malfunctions and the user cannot return it to an operational state. The user turns off the MS and removes the SIM card provided by the mobile operator (MO) or mobile virtual network operator (MVNO) and replaces it with the diagnostic SIM card. The user then restarts the MS and is prompted to establish a data connection in order the receive information that will resolve the problem(s) with the MS. The prompt may be initiated by software resident on the diagnostic SIM card, possibly in combination with additional software resident in the MS itself. As previously mentioned, data charges associated with the use of the virtual SIM in a diagnostic mode may be borne by a third party such as the provider of the MS-resident software that requires the diagnostic services. The diagnostics then resolve the problem and return the MS to a known state or to a new/updated state, after which the user is prompted to re-insert their normal SIM card provided by the mobile operator. In response to the prompt the user turns off the MS, removes the diagnostic SIM card, inserts the normal SIM card and turns on the MS, which boots up into the known state or the new/updated state.

Figure 4:
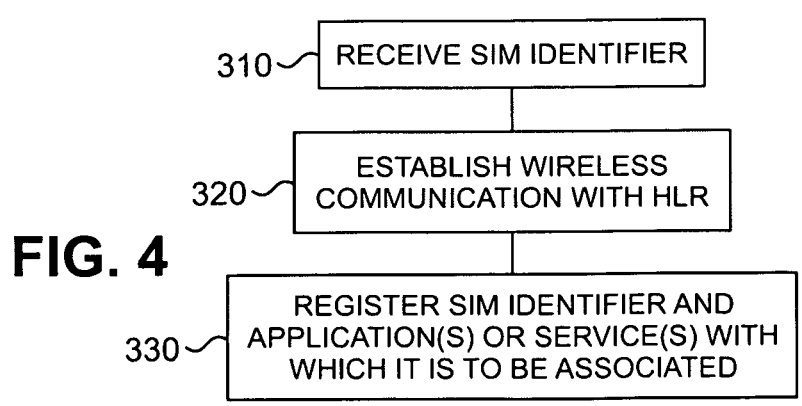
FIG. 4 is a flowchart illustrating one particular example of a method for associating a mobile station subscriber with at least one application or service.

FIG. 4 is a flowchart illustrating one particular example of a method for associating a mobile station subscriber with at least one application or service. The method begins in step 310 when a (SIM) identifier is received. The SIM identifier, which identifies a SIM associated with a subscriber, may be received by downloading it to the mobile station in the event that the SIM is a virtual SIM. The SIM identifier is to be bound to at least one application or service that the subscriber is authorized to access over a wireless network. Next, in step 320 a wireless communication connection is established between a mobile station in which the SIM is employed and an HLR in order to perform a registration process. The SIM identifier and the application(s) or service(s) are registered with the HLR in step 330 so that the SIM identifier is bound to the application or service. The application or service is in addition to mobile telephony services offered by a mobile operator and which are used to perform the registration process with the HRL.

The various memory units employed in the mobile station shown in FIG. 2 are computer-readable media that represent any number and combination of local or remote devices, in any form, now known or later developed, capable of recording, storing, or transmitting computer-readable data, such as the instructions executable by processor CPU 402. In particular, computer-readable media may be, or may include, a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; a paper tape; a punch card; or any combination thereof.

Computer programs such as emulation software 230 employed in the virtual SIM represent any signal processing methods or stored instructions that electronically control predetermined operations on data. In general, computer-executable instructions are computer programs implemented as software components according to well-known practices for component-based software development, and encoded in computer-readable media. Computer programs may be combined or distributed in various ways.

Functions/components described herein are not limited to implementation by any specific embodiments of computer programs. Rather, functions are processes that convey or transform data, and may generally be implemented by, or executed in, hardware, software, firmware, or any combination thereof, located at, or accessed by, any combination of functional elements of the mobile station or the SIM.

It will be understood that all of the aspects of the subject matter described herein need not be used in a particular implementation, nor must the aspects, when used, be present concurrently. Functions/components described herein as being computer programs are not limited to implementation by any specific embodiments of computer programs. Rather, functions are processes that convey or transform data, and may generally be implemented by, or executed in, hardware, software, firmware, or any combination thereof.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

As it is understood that embodiments other than the specific embodiments described above may be devised without departing from the spirit and scope of the appended claims, it is intended that the scope of the subject matter herein will be governed by the following claims.

What is claimed is:

1. A method performed on a computing device, the method comprising: utilizing, by the computing device, a virtual subscriber identity module ("SIM") card that is configured for emulating a plurality of physical SIM cards, where the virtual SIM card includes an International Mobile Subscriber Identity ("IMSI") from each of the emulated plurality of physical SIM cards, and where the virtual SIM card is further configured for providing the functionality of each of the emulated plurality of physical SIM cards.

2. The method of claim 1 where the virtual SIM is implemented in software on the computing device.

3. The method of claim 1 further comprising downloading the virtual SIM.

4. The method of claim 1 where the virtual SIM is utilized by the computing device in conjunction with a physical SIM card.

5. The method of claim 1 where the virtual SIM replaces a physical SIM card on the computing device.

6. The method of claim 1 further comprising simultaneously associating the computing device with a plurality of wireless services based on the virtual SIM emulating the plurality of physical SIM cards.

7. The method of claim 1 where the virtual SIM provides application-specific SIM functionality.

8. A computing device comprising:
at least one processor; and
memory coupled to the at least one processor;
an emulator that comprises instructions that, based on execution by the at least one processor, configure the computing device to: utilize a virtual subscriber identity module ("SIM") that is configured for emulating a plurality of physical SIM cards, where the virtual SIM card includes an International Mobile Subscriber Identity ("IMSI") from each of the emulated plurality of physical SIM cards, and where the virtual SIM is further configured for providing the functionality of each of the emulated plurality of physical SIM cards.

9. The computing device of claim 8 where the virtual SIM is implemented in software on the computing device.

10. The computing device of claim 8 further configured to download the virtual SIM.

11. The computing device of claim 8 where the virtual SIM is utilized by the computing device in conjunction with a physical SIM card.

12. The computing device of claim 8 where the virtual SIM replaces a physical SIM card on the computing device.

13. The computing device of claim 8 further configured to simultaneously associate the computing device with a plurality of wireless services based on the virtual SIM emulating the plurality of physical SIM cards.

14. The computing device of claim 8 where the virtual SIM provides application-specific SIM functionality.

15. At least one computer-readable storage device comprising: memory that comprises computer-executable instructions that, based on execution by a computing device, configure the computing device to perform actions comprising: utilizing a virtual subscriber identity module ("SIM") that is configured for emulating a plurality of physical SIM cards, where the virtual SIM card includes an International Mobile Subscriber Identity ("IMSI") from each of the emulated plurality of physical SIM cards, and where the virtual SIM is further configured for providing the functionality of each of the emulated plurality of physical SIM cards.

16. The at least one computer-readable storage device of claim 15, the actions further comprising downloading the virtual SIM.

17. The at least one computer-readable storage device of claim 15 where the virtual SIM is utilized by the computing device in conjunction with a physical SIM card.

18. The at least one computer-readable storage device of claim 15 where the virtual SIM replaces a physical SIM card on the computing device.

19. The at least one computer-readable storage device of claim 15, the actions further comprising simultaneously associating the computing device with a plurality of wireless services based on the virtual SIM emulating the plurality of physical SIM cards.

20. The at least one computer-readable storage device of claim 15 where the virtual SIM provides application-specific SIM functionality.

* * * * *